United States Patent
Bartram et al.

(10) Patent No.: US 11,789,829 B2
(45) Date of Patent: Oct. 17, 2023

(54) INTERPROCESS COMMUNICATION FOR ASYNCHRONOUS TASKS

(71) Applicant: Capital One Services, LLC, McLean, VA (US)

(72) Inventors: Christian Bartram, McLean, VA (US); Connor Cason, McLean, VA (US); Yvette White, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 234 days.

(21) Appl. No.: 17/241,284

(22) Filed: Apr. 27, 2021

(65) Prior Publication Data

US 2022/0342780 A1 Oct. 27, 2022

(51) Int. Cl.
| | |
|---|---|
| *G06F 11/00* | (2006.01) |
| *G06F 11/14* | (2006.01) |
| *G06F 9/54* | (2006.01) |
| *G06F 16/23* | (2019.01) |

(52) U.S. Cl.
CPC .......... *G06F 11/1474* (2013.01); *G06F 9/546* (2013.01); *G06F 16/2379* (2019.01); *G06F 11/1469* (2013.01); *G06F 2201/82* (2013.01)

(58) Field of Classification Search
CPC .......................... G06F 11/1474; G06F 11/1469
USPC ....................................................... 714/1–57
See application file for complete search history.

(56) References Cited

U.S. PATENT DOCUMENTS

| | | | | |
|---|---|---|---|---|
| 7,117,389 B2* | 10/2006 | Luick | .................. | G06F 11/2035 |
| | | | | 714/10 |
| 2003/0061537 A1* | 3/2003 | Cha | ..................... | G06F 11/1471 |
| | | | | 714/E11.13 |
| 2010/0174944 A1* | 7/2010 | Urhan | ................. | G06F 11/1438 |
| | | | | 714/E11.023 |
| 2012/0005530 A1* | 1/2012 | Marathe | .................. | G06F 9/467 |
| | | | | 712/225 |
| 2012/0079245 A1* | 3/2012 | Wang | .................... | G06F 9/3842 |
| | | | | 712/228 |
| 2012/0198281 A1* | 8/2012 | Weinberg | ............ | G06F 11/3688 |
| | | | | 714/E11.029 |
| 2013/0097465 A1* | 4/2013 | Eslambolchi | ........... | G06F 11/34 |
| | | | | 714/57 |
| 2016/0048351 A1* | 2/2016 | Kanteti | ............... | G06F 11/1464 |
| | | | | 714/19 |
| 2016/0335113 A1* | 11/2016 | Gorst | .................... | G06F 9/5011 |

(Continued)

*Primary Examiner* — Sarai E Butler
(74) *Attorney, Agent, or Firm* — Perkins Coie LLP

(57) ABSTRACT

Methods and systems are disclosed herein for managing software operations in a computer system. A software operation may include many tasks. The tasks may be grouped together based on the tasks' dependencies on output generated from other tasks. Each group of tasks may be placed in a block of a blockchain based on the dependencies. If the output of a block fails to pass a validation test, the tasks in each block may be undone in an organized order (e.g., starting with the most recently performed task and using the one or more rollback functions associated with each task), which may prevent problems that could occur when some asynchronous tasks complete and others fail. Use of the blockchain may allow the computer system to determine more precisely where an operation failed and may allow the computer system to determine more information about the failure.

20 Claims, 6 Drawing Sheets

(56) References Cited

U.S. PATENT DOCUMENTS

2017/0115976 A1\* 4/2017 Mills ..................... G06Q 10/06
2019/0236562 A1\* 8/2019 Padmanabhan ......... H04L 63/00

\* cited by examiner

| Task ID | Inputs | Outputs | Validation Rule |
|---|---|---|---|
| 211 | None | Account numbers | Validate format |
| 212 | Input from user device | Authentication code | Validate authentication code |
| 213 | Account numbers<br>Authentication code | Library content | Validate library content |
| 214 | Library content<br>Input from user device | Database response | Validate database response |

FIG. 2

INTERPROCESS COMMUNICATION FOR ASYNCHRONOUS TASKS

BACKGROUND

Current computing systems are designed to perform complex operations that often include multiple tasks such that execution of some tasks depend on results of execution of other tasks within an operation. In some cases, one or more of the tasks may succeed while one or more other tasks fail. If one or more of the tasks fail, it may be necessary to roll back the tasks that succeeded. However, it may be difficult to identify the tasks that need to be rolled back, especially if some of the tasks are performed asynchronously. For example, a software operation to book a trip over the Internet may include tasks for generating an airline ticket reservation (e.g., via an application programming interface), a hotel reservation, a rental car reservation, and an excursion reservation. This software operation may be designed to be executed asynchronously. For example, airline ticket reservation, hotel reservation, car reservation and excursion reservation may all be done in parallel (e.g., asynchronously). It is possible that the airline ticket reservation fails while the other tasks are completed successfully. In this instance, the completed reservations need to be rolled back because without an airline ticket reservation the other portions of the trip cannot be used because the user is not going to be able to get to the location. Thus, in this instance, the hotel reservation, the car reservation, and the excursion reservation should depend on the result of the airline ticket reservation.

To address these dependencies software developers started adding complex programming instructions to these already complex operations such that the coding instructions instruct the system which rollback operations to perform when various tasks fail. This additional code is very difficult to maintain (e.g., it is hard to understand what the system is doing). In addition, it is very difficult to add new operations into the mix, because updating already complex code will require lots of manual effort.

SUMMARY

To address these and other issues, computing systems may use one or more blockchains to manage software operations. A software operation may include many tasks, with some tasks being able to be executed asynchronously and some tasks needing to be executed synchronously (e.g., because one task may depend on another task). Each task may be associated with one or more execution functions and one or more rollback functions. An execution function may cause the computing system to perform the task, while a rollback function may cause the computing system to roll back the task that the execution function performed. The tasks may be grouped together based on the tasks' dependencies on output generated from other tasks. Each group of tasks may be written to a block of a blockchain based on those dependencies. For example, a group of tasks with no dependencies on other tasks may be placed in the first block in the blockchain, a group of tasks that depend on tasks in the first block may be placed in the second block in the blockchain, and so on. This may enable tasks to be executed in an efficient order, for example, because each task in a block may be executed in parallel. If the output of a block fails to pass a validation test, the tasks in each block may be rolled back in an organized order (e.g., starting with the most recently performed task and using the one or more rollback functions associated with each task), which may prevent problems that could occur when some asynchronous tasks complete and others fail. Use of the blockchain may allow the computer system to determine more precisely where an operation failed and may allow the computer system to determine more information about the failure. For example, pinpointing the block in the block chain that failed may allow the computer system to determine the names of the tasks that may have caused the failure, the state of inputs that went into the failed block, and the outputs of the failed block. This information may increase the computer system's and/or a programmer's ability to diagnose and fix errors.

A computer system may receive data for tasks that are part of a software operation. For example, the software operation may include booking a trip with separate tasks for reserving airline tickets, verifying payment information, reserving a hotel, reserving a rental car, and reserving an excursion. The data may indicate validation rules, input requirements, and output requirements for each task. The input requirements and/or output requirements may indicate outputs of tasks that are to be used as inputs for other tasks. For example, data may indicate that the airline tickets need to be reserved before the hotel and car can be reserved, and the hotel and car need to be reserved before the excursion can be reserved. The computer system may use the input requirements and/or output requirements to determine dependencies indicating which tasks are dependent on other tasks. The computer system may use the dependencies to determine groups of tasks. Each group may include tasks that may be executed in parallel. For example, the tasks for obtaining the car and hotel reservation may be placed in the same group and may be executed in parallel. The computer system may also determine the sequence or order that each group of tasks should be executed in. The computer system may generate, for each group of tasks, a corresponding block of a blockchain. Each block may be generated and linked in the blockchain according to the determined sequence. For example, the task for reserving the airline ticket and verifying payment information may be assigned to the first block, the tasks for reserving the car and hotel reservations may be assigned to the second block, and the task for reserving the excursion may be assigned to the third block. The computer system may execute all tasks assigned to a first block of the blockchain in parallel and may determine, using one or more validation rules associated with the first block, that each task assigned to the first block has executed successfully. For example, the computer system may validate the output of the first block by checking for a code that indicates that the payment information is valid and/or that reservation details for the airline ticket match a user's request. The computer system may execute one or more tasks assigned to a second block of the blockchain. The computer system may use one or more outputs generated from execution of tasks assigned to the first block as input to the execution of tasks assigned to the second block. For example, the computer system may use the airline ticket reservation date as input to the tasks for reserving the hotel and car. The computer system may determine, using one or more validation rules associated with the second block, that one or more tasks assigned to the second block have not executed successfully. In response to determining that one or more tasks assigned to the second block have not executed successfully, the computer system may execute a rollback function associated with the second block. For example, if the hotel reservation fails, the computer system may reverse the car rental reservation. Subsequent to executing the one or more rollback functions associated with the second block, the computer system may execute one or more rollback functions associated with the first block. For example, after reversing the car rental reservation, the computer system may reverse the reservation of the airline ticket and/or reverse a charge to the user's credit card.

Through the use of blockchain, the computer system may be able to group tasks together based on dependencies. As inherent in blockchain operations, each block has a pointer to the next block and a previous block, which may enable the computer system to maintain an ordering of groups of tasks in a software operation. Using the blockchain may increase efficiency by simplifying the process of reversing tasks when one or more tasks fails in the blockchain. The blockchain may also enable errors in a operation to be determined more quickly. Furthermore, the use of blockchain may enable easier code maintenance by providing the ability to add and remove tasks from the operation as needed without having to make complex code changes.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an." and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows a table with example task data, in accordance with some embodiments.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
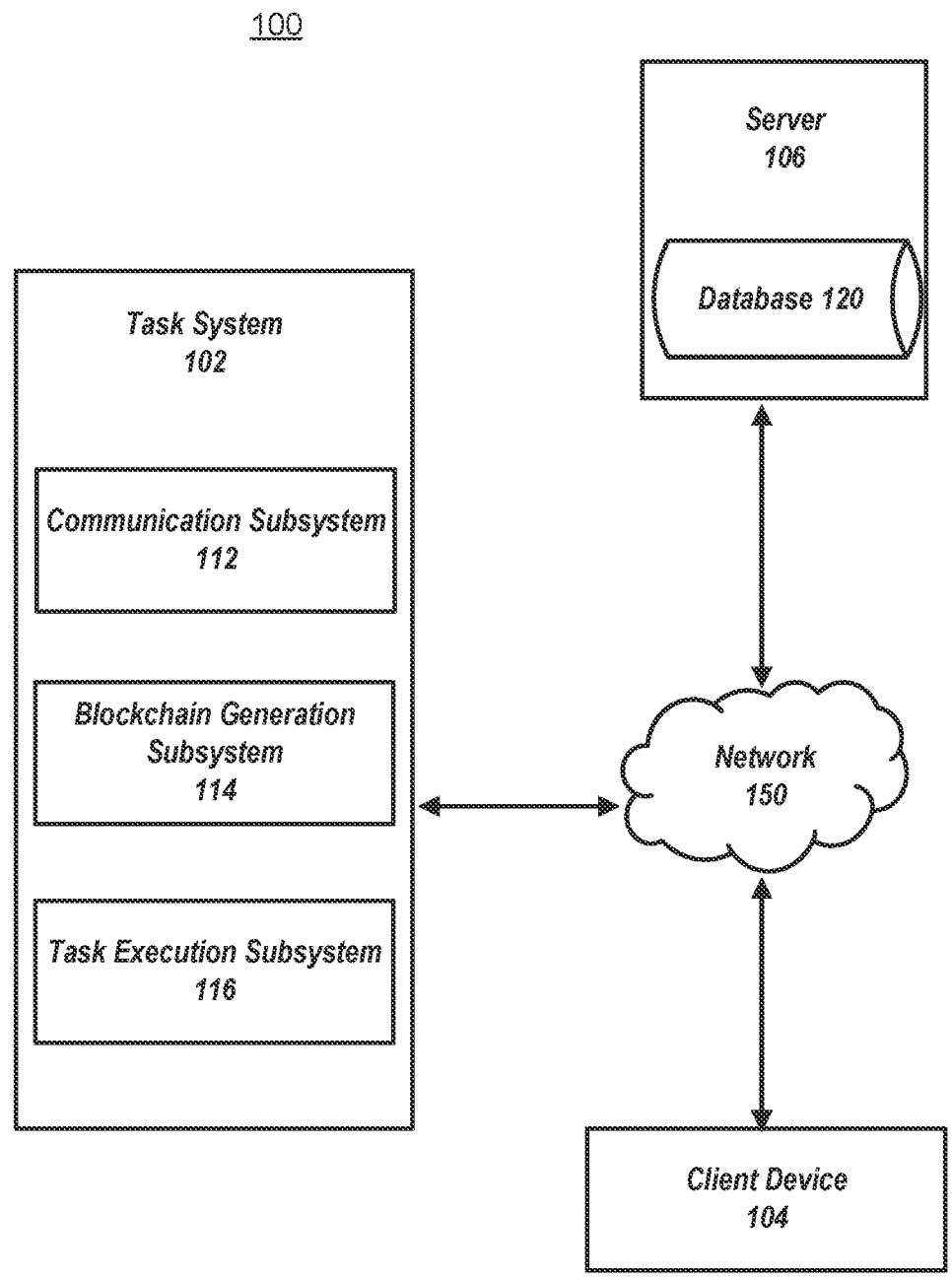
FIG. 1 shows an example task system for using blockchain to manage software operations, in accordance with some embodiments.

FIG. 1 shows an example computing system 100 for using blockchain to manage software operations (e.g., managing interprocess communication for asynchronous tasks). For example, the operation may include using a computer system to book a vacation trip, which may include tasks for reserving an airline ticket, a hotel stay, a car rental, and/or an excursion. The system 100 may group tasks together based on different inputs that are required by each task and/or outputs that are generated by each task. Each task in a group may be performed in parallel with other tasks in the same group. That is, the tasks in a particular group are not dependent on other tasks in the same group. For example, a hotel reservation task and a car rental task may be assigned to the same group because they may be performed in parallel. A blockchain may be generated where each block in the blockchain is associated with one of the groups of tasks. For example, a first block may be associated with an airline ticket reservation task, and a second block may be associated with a car rental reservation task. The blockchain may be a sequence of blocks. The system 100 may associate groups of tasks with blocks in a sequence that is based on dependencies of the tasks. For example, a first group (e.g., the airline reservation task) may generate one or more outputs (e.g., the date/time of the flight) that is needed before a second group of tasks (e.g., the car and/or hotel reservation) can perform their functions. The groups may be organized (e.g., based on information indicating input requirements and/or outputs of each task) so that tasks that can be performed in parallel are placed in the same group. This may increase the efficiency of the system 100, by allowing as many tasks to be performed in parallel as possible. Each block of tasks in the blockchain may be executed in sequence. For example, all of the tasks in the first block may be executed (e.g., in parallel with each other), followed by all of the tasks in the second block (e.g., in parallel with each other), and so on until the tasks associated with the last block are executed. Output from one block in the blockchain may be used in one or more subsequent blocks (e.g., by the tasks associated with a subsequent block) in the blockchain. The tasks in a block may be output and validated (e.g., using one or more validation rules) before they are input into the next block in the blockchain. Each task may have an associated rollback function to undo the task, for example, if the output associated with the corresponding block does not pass validation. The system 100 may use the rollback functions to undo one or more tasks that were performed by the system 100.

The system 100 may include a task system 102, a client device 104, and/or a server 106. The client device 104 may be any computing device, including, but not limited to, a laptop computer, a tablet computer, a hand-held computer, smartphone, other computer equipment (e.g., a server or virtual server), including "smart," wireless, wearable, and/or mobile devices. The client device may be used to send a request to perform a software operation to the task system 102. A software operation may include one or more tasks performed by software. For example, a software operation may include online shopping, web browsing, machine learning, banking functionality, or any other activity that can be performed using software. A software operation may include a plurality of tasks. For example, a software operation to purchase an airline ticket may include a task that involves processing a user's credit card, a task that involves accessing a database to determine ticket information, and/or a task that involves updating a database to show that a ticket has been purchased. Although only one client device 104 is shown, the system 100 may include any number of client devices, which may be configured to communicate with the task system 102 via the network 150.

Each task may be associated with a rollback function that reverses any effects caused by the execution of the task. For example, if execution of a task causes a hotel reservation to be made, the rollback function associated with the task may cause the reservation to be cancelled. Rollback functions for a task may be defined by a user (e.g., a software developer) and/or retrieved from the database 120. A rollback function for a task that includes updating a database may include reverting the database to a state that existed before the task was performed (e.g., reversing a modification to the database).

The server 106 may include a database 120 that stores data corresponding to tasks. The data may include an indication of the inputs required for a task (e.g., if any), outputs generated via the performance of the task, an identification of the task. Referring to FIG. 2, a table 200 with example data corresponding to a plurality of tasks is shown. For example, the data may include an identification (ID) 202, inputs 204, outputs 206, and/or one or more validation rules 208 corresponding to each task. As an example, the task 211 may require no inputs, may output one or more account numbers, and a validation rule that is used to validate the format of the account numbers (e.g., using regular expressions, or other methods). As an additional example, the task 212 may require user input received from the user device (e.g., to verify that a human is operating the user device), may output an authentication code (e.g., verifying that a human is operating the user device, or a code indicating that verification of a human user was not achieved), and a validation rule that checks the authentication code output by the task 212 is the correct code (e.g., the code indicating that a human is operating the user device). As an additional example, the tasks 213 may require the account numbers output in connection with task 211 and/or the authentication code output in connection with task 212 as input. The task 213 may output an indication of library content (e.g., music library, books, courses, documents, etc.) and may be associated with a validation rule that validates the library content (e.g., to make sure that content was correctly output, etc.). As an additional example, the task 214 may require library content and/or input from a user device (e.g., indicating additional content to add to the library). Execution of the task 213 may output a response from a database (e.g., to reflect the additional content that was added to the library). The task 214 may be associated with a validation rule for use in validating the database response (e.g., the task system 102 may verify that the response indicates that a modification to the database was successful). The server 106 may send data from the database 120 to the task system, for example, based on a request to perform a software operation (e.g., received from the client device 104).

The task system 102 may include one or more computing devices described above and/or may include any type of mobile terminal, fixed terminal, or other device. For example, the task system 102 may be implemented as a cloud computing system and may feature one or more component devices. A person skilled in the art would understand that system 100 is not limited to the devices shown. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the task system 102, those operations may be performed by components of the client device 104, and/or server 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the task system 102 using two different client devices.

One or more components of the task system 102, client device 104, and/or server 106, may receive content and/or data via input/output (hereinafter "I/O") paths. The one or more components of the task system 102, the client device 104, and/or the server 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the task system 102, the client device 104, and/or the server 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to using blockchain to manage software operations.

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM. RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., task system 102, the client device 104, and/or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the task system 102, any component of the task system (e.g., the communication subsystem 112, the blockchain generation subsystem 114, and/or the task execution subsystem 116), the client device 104, and/or the server 106 may be implemented by one or more computing platforms operating together as the computing devices.

The task system 102 may include a communication subsystem 112. The communication subsystem 112 may receive task data corresponding to a plurality of tasks. The task data may include a list of tasks that are part of a software operation (e.g., a software operation that the client device 104 has requested the task system 102 to complete). The task data may include a validation rule for each task, a task name or ID for each task, a corresponding input for each task, a corresponding output for each task, and/or data comprising output requirements indicating one or more outputs of one or more tasks that are to be used as one or more inputs for one or more other tasks. For example, the task data may include data as described above in connection with FIG. 2.

The task system 102 may include a blockchain generation subsystem 114. The blockchain generation subsystem 114 may determine a plurality of dependencies for the tasks indicated by the task data. The plurality of dependencies may indicate which tasks depend on other tasks (e.g., output generated by other tasks, the completion of execution of other tasks, etc.). The dependencies may indicate an order that the tasks should be completed in. The dependencies may be determined based on the indication of inputs and outputs for each task. For example, task 213 of FIG. 2 may be dependent on tasks 211 and 212 because the inputs required by task 213 (e.g., the account numbers and authentication code) are output by the tasks 211 and 212. The blockchain generation subsystem 114 may determine, based on the output requirements, a plurality of dependencies for the plurality of tasks. The dependencies may be used for determining which tasks may be run in parallel, which tasks may be grouped together, and/or which tasks may be assigned to the same block in a blockchain, for example, as discussed in more detail below.

The blockchain generation subsystem 114 may determine, based on the plurality of dependencies, a plurality of groups of tasks. Each group may include tasks to be executed in parallel. A first group may include one or more tasks that have no dependencies (e.g., no required inputs). For example, the tasks in the first group may include retrieving information from one or more databases. A second group may include one or more tasks that require using the output generated from executing the first group of tasks as input (e.g., the information retrieved from the one or more databases). Dependencies may be determined for example, based on data received by the blockchain generation subsystem 114. For example, the blockchain generation subsystem 114 may access a data structure that stores indications of dependencies and may iterate through the data to determine which tasks have no dependencies (e.g., task 211 in FIG. 2). The blockchain generation subsystem 114 may determine that the first group should be executed first because the second group depends on the first group. For example, a first group that includes reserving an airline ticket may be executed first because a second group relies on the information (e.g., the date/time of the ticket) to execute.

Additionally or alternatively, the blockchain generation subsystem 114 may determine dependencies by retrieving (e.g., from the task data) a first data structure associated with a first task and a second data structure associated with a second task. The blockchain generation subsystem 114 may determine, based on information in the second data structure, that output of the first task should be used as input for the second task. For example, the blockchain generation subsystem 114 may compare the outputs of tasks 211-212 of FIG. 2 with the inputs of task 213 (e.g., by matching a label of the input with a label of the output), and determine that task 213 depends on tasks 211-212 because tasks 211-212 generate the account numbers and authentication code that are used as input into task 213. In response to determining that the output of the first task should be used as the input for the second task, the blockchain generation subsystem 114 may assign the first task to a first group and the second task to the second group. The first group may be assigned to the first block of the blockchain and the second group may be assigned to the second block in the blockchain. For example, the task for reserving an airline ticket may be assigned to the first group because other tasks (e.g., a task for reserving the hotel and/or a task for reserving the car rental) depend on information associated with the airline reservation (e.g., date/time of flight, credit card used to reserve flight, the name of the person for whom the flight is reserved, etc.).

Each group of tasks may execute in a sequence or order. For example, the first group of tasks may be executed (e.g., in parallel to improve efficiency and/or reduce runtime) first, and then the second group of tasks may be executed (e.g., after all of the tasks in the first group of tasks have finished executing). Each task in the second group of tasks may be executed in parallel with other tasks of the second group.

The blockchain generation subsystem 114 may generate a blockchain for the tasks. Each block in the blockchain may correspond to one group of tasks. Thus, the block generating subsystem 114 may use inherent capabilities of the blockchain to achieve efficiency. The blockchain specifies an order or sequence for each block when that block is written to the blockchain. The sequence is indicated by pointers between blocks. That is, each block in the blockchain includes a pointer to a subsequent block and/or a pointer to a previous block in the blockchain. One block may be designated as the first block in the blockchain and another block may be designated as the last block in the blockchain. In some embodiments, information needed for execution of a group of tasks may be stored in each block. For each task, the block may store an execution function, a rollback function, and/or a validation rule stored by the block. In some embodiments, a block may store pointers to each of an execution function, rollback function, and/or a validation function.

Figure 3:
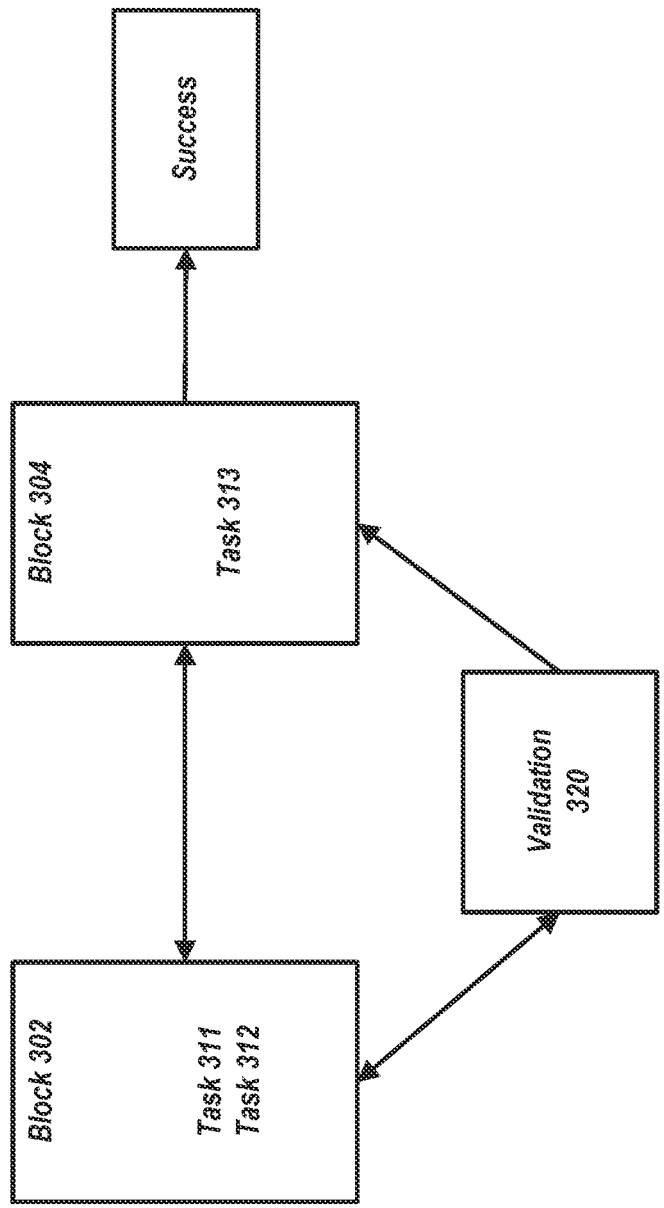
FIG. 3 shows an example blockchain, in accordance with some embodiments.

FIG. 3 shows an example blockchain 300 that may be generated by the blockchain generation subsystem 114. The block 302 may include a first group of tasks including task 311 and 312. The block 304 may include a second group of tasks including task 313. The first group and second group of tasks may have been determined based on input/output information received from the server 106. Block 302 may be designated as the first block in the blockchain, for example, because executing task 311 and task 312 require no inputs from other tasks. Block 304 may be designated as the second block in the blockchain because task 313 requires output from the execution of task 311 and/or task 312. The tasks associated with the blockchain 300 may be executed in a sequence starting with the tasks in block 302. For example, task 311 and task 312 may be executed in parallel. After completion of the execution of tasks 311 and/or task 312, the output of the block 302 (e.g., the output generated from executing the tasks associated with the block 302) may be validated (e.g., by the blockchain generation subsystem 114 and/or the task subsystem 116) using validation rule 320. The output from block 302 may be input into the block 304, for example, if the output of block 302 satisfies the validation rule 320. The task in block 304 (e.g., task 313) may then be executed using the output of block 302 as input. The output generated by the execution of task 313 may be validated based on a validation rule associated with task 313 (not shown in FIG. 3). The blockchain may be considered successfully executed, for example, if each validation check associated with the blockchain is passed.

Figure 4:
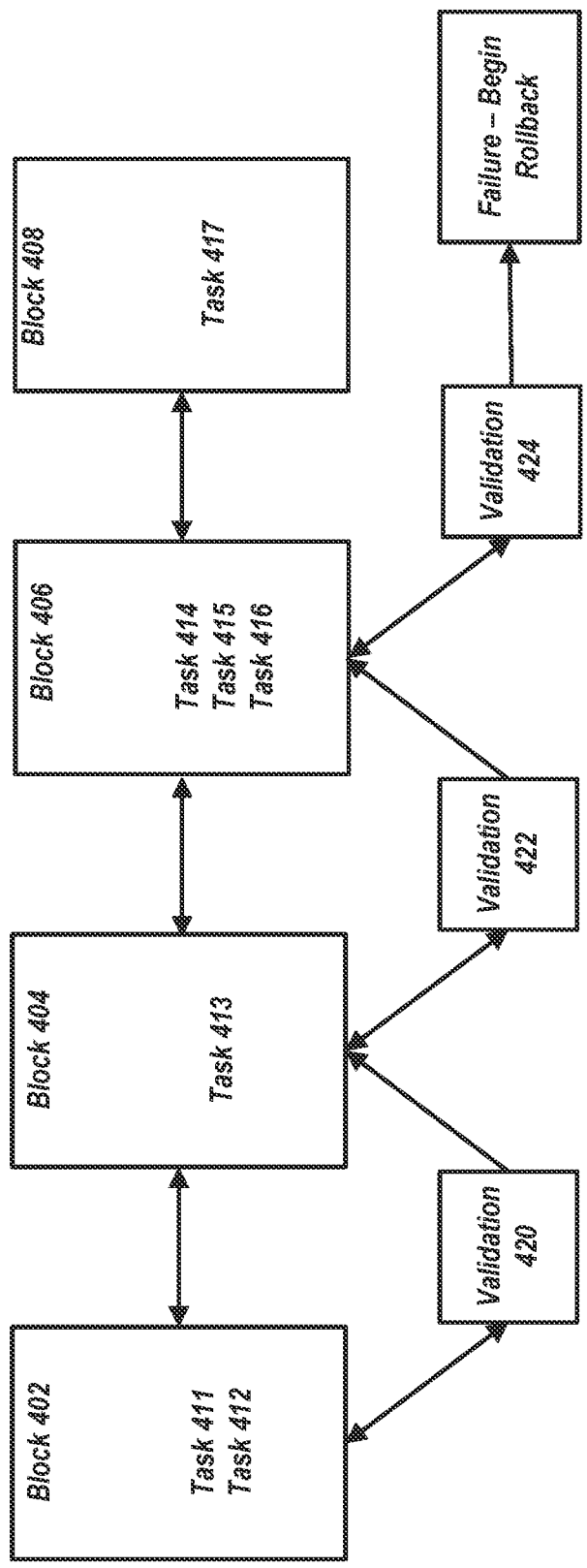
FIG. 4 shows an example blockchain, in accordance with some embodiments.

The task system 102 may include task execution subsystem 116. The task execution subsystem 116 may execute tasks associated with a blockchain generated by the blockchain generation subsystem 114. Referring to FIG. 4, an additional example blockchain 400 is shown. The task execution subsystem 116 may use the blockchain 400 to determine which tasks to execute and in what order tasks should be executed in. The blockchain generation subsystem 114 may have used task data received from the server 106 to determine four groups of tasks. The first group (including tasks 411-412) may have been assigned to block 402, the second group (including task 413) may have been assigned to block 404, the third group (including tasks 414-416) may have been assigned to block 406, and the fourth group (including task 417) may have been assigned to block 408. Validation block 420 may comprise one or more validation rules associated with tasks 411-412 and may be used to validate the output of block 402. Validation block 422 may comprise one or more validation rules associated with task 413 and may be used to validate output of block 404. Validation block 424 may comprise one or more validation rules associated with tasks 414-416 and may be used to validate the output of block 406.

The task execution subsystem 116 may execute tasks assigned to a first block of a blockchain. The tasks within a block may be executed in parallel with other tasks in the same block. For example, task 411 and task 412 may be executed in parallel. The task execution subsystem 116 may determine, using one or more validation rules associated with the one or more tasks assigned to the first block, that each task assigned to the first block has executed successfully. For example, the task execution subsystem 116 may use validation rules indicated by validation block 420 to validate the output of the block 402 (e.g., the output of the execution of tasks 411-412). For example, the task execution subsystem may use the validation rules to check for particular values, may confirm that output matches particular regex patterns, or may perform any other validation of the output.

The task execution subsystem 116 may execute one or more tasks assigned to a second block of the blockchain. The task execution subsystem 116 may use one or more outputs generated from execution of tasks assigned to the first block as input into the second block (e.g., as input into the tasks associated with the second block). For example, the task execution subsystem 116 may use the outputs generated from the execution of tasks 411-412 as input into the execution of task 413.

The task execution subsystem 116 may determine, using one or more validation rules associated with the one or more tasks assigned to the second block, that one or more tasks assigned to the second block have not executed successfully. For example, the task execution subsystem 116 may determine that the output of block 404 (e.g., the output generated from the executing of task 413) did not pass a validation test using validation rules associated with validation block 422.

In response to determining that one or more tasks assigned to the second block have not executed successfully, the task execution subsystem 116 may execute one or more rollback functions assigned to the second block. For example, the task execution subsystem 114 may execute a rollback function associated with the block 404 (e.g., the rollback function of task 413). Subsequent to executing the one or more rollback functions assigned to the second block, the task execution subsystem 116 may execute one or more rollback functions assigned to the first block. For example, the task execution subsystem 116 may execute a rollback function associated with the task 411 and/or a rollback function associated with the task 412. The rollback functions for the block 402 may be executed in parallel. For example, the task execution subsystem 116 may execute the rollback function for task 411 in parallel with the rollback function for task 412.

If an output of any block fails to pass a validation check, the tasks in the block and all tasks in all preceding blocks may be undone by executing the associated rollback functions. The rollback functions may be executed in reverse order of the execution of the tasks. For example, if the output of block 406 had failed validation (e.g., according to validation rules associated with validation block 424), the task execution subsystem 116 may have executed rollback functions for tasks 414-416 (e.g., in parallel), then the task execution subsystem 116 may have executed one or more rollback functions for task 413 (e.g., in parallel), and then the task execution subsystem may have executed one or more rollback functions for tasks 411-412 (e.g., in parallel).

The task execution subsystem 116 may store (e.g., in database 120) information indicating the blockchains and the results of executing the tasks associated with the blockchains (e.g., the output of one or more validation functions associated with each block in a blockchain). The task execution subsystem 116 may process the information to determine an issue with the computing system 100 based on one or more tasks that fail more than a threshold quantity of times (e.g., 10 times within a 5 minute window, 100 times within a 1 minute time period, etc.). The task execution subsystem 116 may access a plurality of blockchains. Each blockchain of the plurality of blockchains may correspond to a first type of task associated with one or more tasks that were determined to not execute successfully. The task execution subsystem 116 may determine a monitoring system associated with the first type of task. The task execution subsystem 116 may send a notification to the determined monitoring system. The notification may indicate an error with a computing system associated with the monitoring system and may be helpful for diagnosing errors and/or resolving errors more efficiently (e.g., more quickly).

Figure 5:
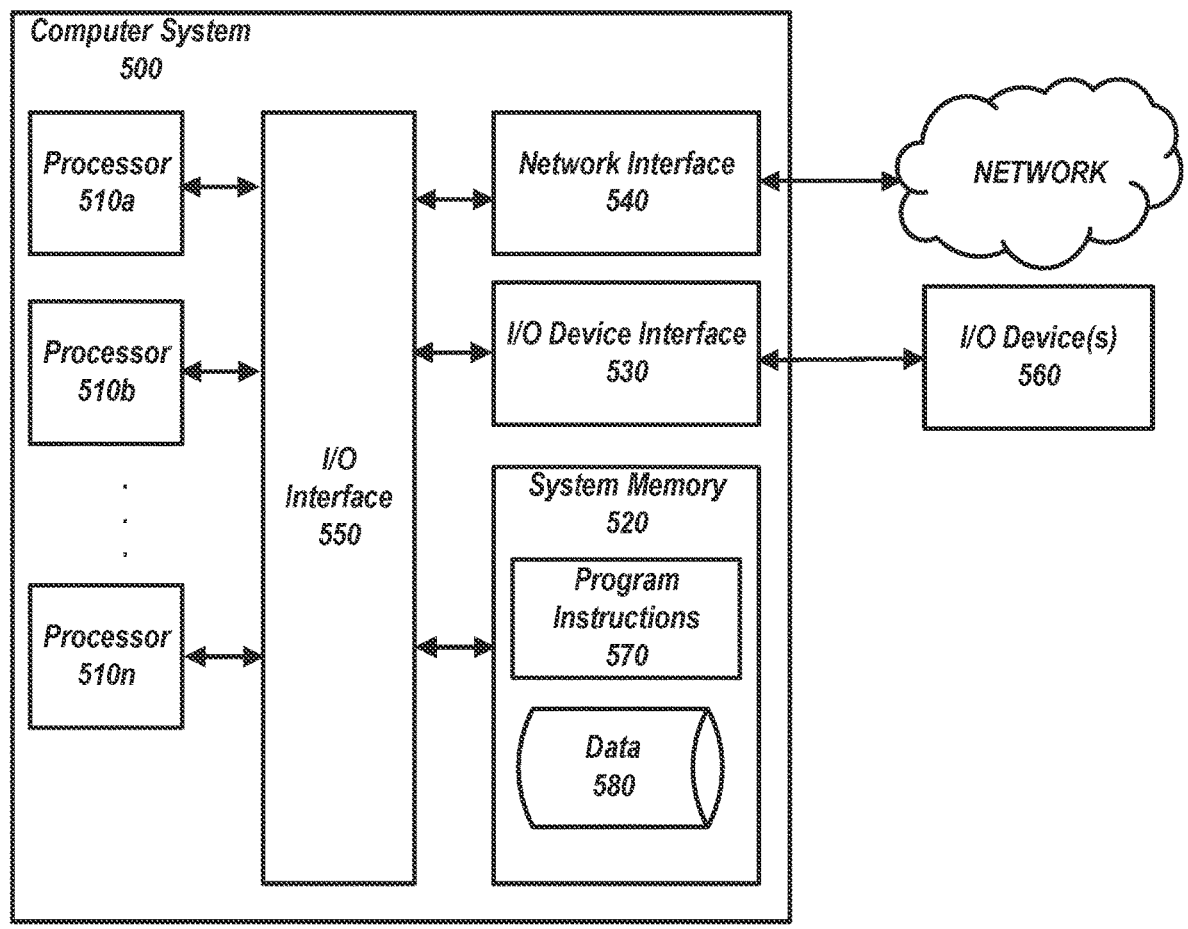
FIG. 5 shows an example computing system that may be used to manage software operations, in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 6:
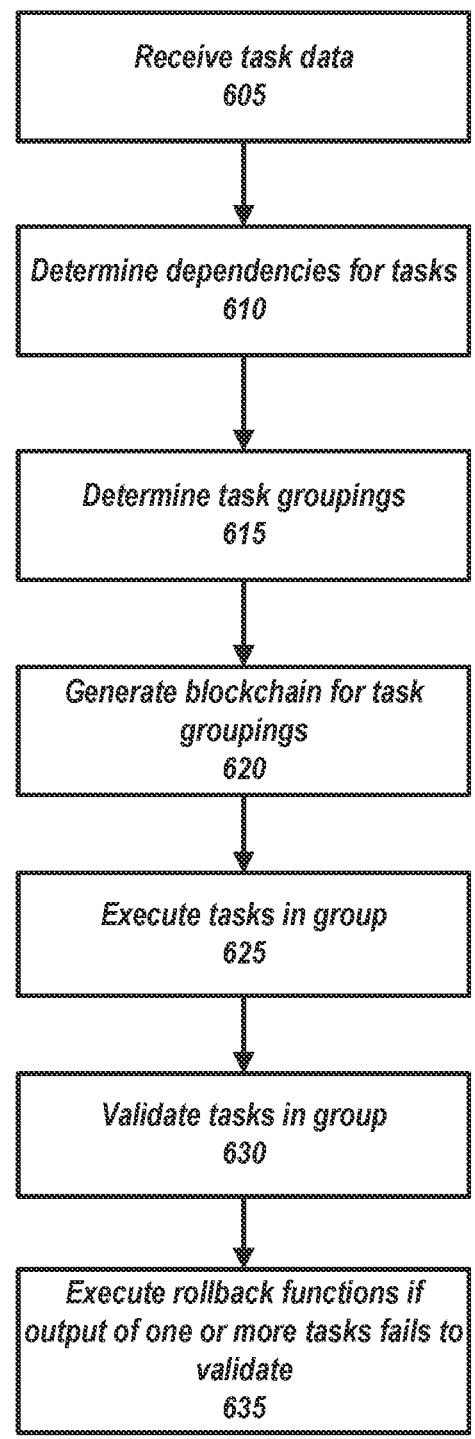
FIG. 6 shows an example flowchart of the actions involved in using blockchain to manage software operations, in accordance with some embodiments.

FIG. 6 shows an example flowchart of the actions involved in involved in using blockchain to manage software operations. For example, process 600 may represent the actions taken by one or more devices shown in FIGS. 1-5 and described above. At 605, task system 102 (e.g., using one or more components in system 100 (FIG. 1) and/or computer system 500 via network interface 540 (FIG. 5)) receives task data. The task data may correspond to a plurality of tasks. The task data may include, for each task of the plurality of tasks, a corresponding validation rule, a corresponding input, a corresponding output. The task data may include output requirements indicating one or more outputs of one or more tasks that are to be used as one or more inputs for one or more other tasks.

At 610, task system 102 (e.g., using one or more components in system 100 (FIG. 1) and/or computing system 500 via one or more processors 510a-510n and system memory 520 (FIG. 5)) determines, based on the output requirements, a plurality of dependencies for the plurality of tasks.

At 615, task system 102 (e.g., using one or more components in system 100 (FIG. 1) and/or computing system 500 via one or more processors 510a-510n, I/O interface 550, and/or system memory 520 (FIG. 5)) determines, based on the plurality of dependencies, a plurality of groups of tasks. Each group of the plurality of groups may include tasks to be executed in parallel. The plurality of groups of tasks may be configured to be executed in a sequence (e.g., an order determined by the task system 102).

At 620, task system 102 (e.g., using one or more components in system 100 (FIG. 1) and/or computing system 500 via one or more processors 510a-510n (FIG. 5)) generates, for each group of tasks, a corresponding block of a blockchain. Each block may be generated and linked in the blockchain according to the sequence (e.g., the sequence determined in step 615).

At 625, task system 102 (e.g., using one or more components in system 100 (FIG. 1) and/or computing system 500 (FIG. 5)) executing all tasks assigned to a first block of the blockchain. Each task assigned to the first block may be executed in parallel (e.g., at the same time, using one or more processors to execute each task separately, etc.).

At 630, task system 102 (e.g., using one or more components in system 100 (FIG. 1) and/or computing system 500 via one or more processors 510a-510n (FIG. 5)) validates the tasks in the first block or group. The task system 102 may determine, using one or more validation rules associated with the one or more tasks assigned to the first block, that each task assigned to the first block has executed successfully.

At 635, task system 102 (e.g., using one or more components in system 100 (FIG. 1) and/or computing system 500 via one or more processors 510a-510n (FIG. 5)) executes one or more rollback functions if the output of one or more tasks fails to execute successfully (e.g., one or more tasks fails to pass a validation text using one or more validation rules). The task system 102 may execute one or more tasks assigned to a second block of the blockchain. The executing may include receiving one or more outputs generated from execution of tasks assigned to the first block. The task system may determine, using one or more validation rules associated with the one or more tasks assigned to the second block, that one or more tasks assigned to the second block have not executed successfully. In response to determining that one or more tasks assigned to the second block have not executed successfully, the task system 102 may execute one or more rollback functions assigned to the second block. Subsequent to executing the one or more rollback functions assigned to the second block, the task system 102 may execute one or more rollback functions assigned to the first block.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive. i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving data corresponding to a plurality of tasks; determining, based on output requirements, a plurality of dependencies for the plurality of tasks; determining, based on the plurality of dependencies, a plurality of groups of tasks; generating, for each group of tasks, a corresponding block of a blockchain; executing all tasks assigned to a first block of the blockchain; and determining, using one or more validation rules associated with the one or more tasks assigned to the first block, that each task assigned to the first block has executed successfully.

2. The method of any of the preceding embodiments, executing one or more tasks assigned to a second block of the blockchain, wherein executing comprises receiving one or more outputs generated from execution of tasks assigned to the first block; determining, using one or more validation rules associated with the one or more tasks assigned to the second block, that one or more tasks assigned to the second block have not executed successfully; and in response to the determining that one or more tasks assigned to the second block have not executed successfully, executing one or more rollback functions assigned to the second block and subsequently to executing the one or more rollback functions assigned to the second block executing one or more rollback functions assigned to the first block.

3. The method of any of the preceding embodiments, wherein the executing one or more rollback functions assigned to the second block comprises: retrieving, from the second block in the blockchain, a plurality of rollback functions; and executing each of the plurality of rollback functions.

4. The method of any of the preceding embodiments, wherein each group of the plurality of groups comprises tasks to be executed in parallel, the executing all tasks assigned to the first block of the blockchain further comprising executing all tasks in parallel.

5. The method of any of the preceding embodiments, wherein the generating the corresponding block of the blockchain comprises: retrieving a plurality of tasks assigned to the first block and a plurality of rollback tasks assigned to the first block, wherein each rollback function is configured to reverse operations associated with the execution of a corresponding task; and writing, to the first block, the plurality of tasks assigned to the first block and the plurality of rollback tasks assigned to the first block.

6. The method of any of the preceding embodiments, wherein the determining the plurality of dependencies for the plurality of tasks comprises: retrieving, from the data, a first data structure associated with a first task and a second data structure associated with a second task; determining, based on information in the second data structure, that output of the first task is used as input for the second task; and in response to determining that the output of the first task is used as the input for the second task, assigning the first task to a first group and the second task to the second group, wherein the first group is assigned to the first block of the blockchain and the second group is assigned to the second block in the blockchain.

7. The method of any of the preceding embodiments, wherein the determining a plurality of groups of tasks comprises: determining, based on the output requirements, a first set of tasks that have no dependencies; and grouping the first set of tasks into a first group of the plurality of groups, wherein the first group is executed before other groups of the plurality of groups.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

What is claimed is:

1. One or more non-transitory machine-readable media storing instructions that, when executed by one or more processors, effectuate operations comprising:
    receiving data corresponding to tasks;
    generating, based on dependencies of the tasks, blocks of a blockchain that collectively include the tasks and pointers to validation and rollback functions respectively associated with the blocks of the blockchain such that: (i) the blocks comprises a first block that include a first subset of the tasks and a second block that includes a second subset of the tasks and points back to the first block of the blockchain, (ii) no task of the tasks included in the first block of the blockchain depends on any output of any task included in any other block of the blockchain, and (iii) each task of the tasks included in the second block of the blockchain depends on at least one task included in the first block of the blockchain;
    executing all of the tasks included in the first block of the blockchain and validating first outputs, obtained from executing the tasks included in the first block of the blockchain, using one or more validations rules associated with the first block of the blockchain; and
    in response to (i) the validation of the first outputs indicating successful execution of the tasks included in the first block of the blockchain and (ii) a validation, of one or more second outputs obtained from executing one or more second tasks included in the second block of the blockchain, indicating non-successful execution of the one or more second tasks, executing one or more second rollback functions associated with the second block of the blockchain and one or more first rollback functions associated with the first block of the blockchain, despite the successful execution of the tasks included in the first block of the blockchain.

2. The one or more non-transitory machine-readable media of claim 1, wherein executing the one or more first rollback functions associated with the first block of the blockchain comprises executing the one or more first rollback functions associated with the first block of the blockchain in response to (i) the validation of the first outputs indicating successful execution of the tasks included in the first block of the blockchain, (ii) the validation of the one or more second outputs indicating non-successful execution of the one or more second tasks included in the second block of the blockchain, and (iii) the execution of the one or more second rollback functions associated with the second block of the blockchain.

3. The one or more non-transitory machine-readable media of claim 1, the operations further comprising:
    executing, based on a first pointer in the first block of the blockchain pointing to the second block of the blockchain, the one or more second tasks included in the second block of the blockchain.

4. The one or more non-transitory machine-readable media of claim 1, wherein validating the first outputs comprises executing, based on a validation function pointer in the first block of the blockchain, one or more first validation functions associated with the validation function pointer on the first outputs obtained from executing the tasks included in the first block of the blockchain.

5. The one or more non-transitory machine-readable media of claim 1, wherein executing the one or more first rollback functions associated with the first block of the blockchain comprises executing, based on a rollback function pointer in the first block of the blockchain, the one or more first rollback functions associated with the first block of the blockchain in response to (i) the validation of the first outputs indicating successful execution of the tasks included in the first block of the blockchain and (ii) the validation of the one or more second outputs indicating non-successful execution of the one or more second tasks included in the second block of the blockchain.

6. The one or more non-transitory machine-readable media of claim 1, wherein generating the blocks of the blockchain based on the dependencies of the tasks comprises:
    assigning the first subset of the tasks to the first block of the blockchain based on a determination that no task of the first subset depends on any output of any task included in the second subset of the tasks;
    assigning the second subset of the tasks to the second block of the blockchain based on a determination that each task of the second subset depends on at least one task of the first subset; and generating the blocks of the blockchain based on the assignment of the first and second subsets respectively to the first and second blocks of the blockchain.

7. The one or more non-transitory machine-readable media of claim 1, wherein generating the blocks of the blockchain based on the dependencies of the tasks comprises:
assigning the first subset of the tasks to the first block of the blockchain based on a determination that no task of the first subset depends on any output of any task included in the second subset of the tasks and that no task of the first subset depends on any output of any other task included in the first subset of the tasks;
assigning the second subset of the tasks to the second block of the blockchain based on a determination that each task of the second subset depends on at least one task of the first subset and that no task of the second subset depends on any output of any other task included in the second subset of the tasks; and
generating the blocks of the blockchain based on the assignment of the first and second subsets respectively to the first and second blocks of the blockchain.

8. A method comprising:
receiving data corresponding to tasks;
generating, based on dependencies of the tasks, blocks of a blockchain that collectively include the tasks, the blocks comprising a first block that include a first subset of the tasks and a second block that includes a second subset of the tasks and points back to the first block of the blockchain, wherein no task of the tasks included in the first block of the blockchain depends on an output of a task included the second block of the blockchain, and wherein each task of the tasks included in the second block of the blockchain depends on at least one task included in the first block of the blockchain;
executing the tasks included in the first block of the blockchain and validating first outputs, obtained from executing the tasks included in the first block of the blockchain, using one or more first validations rules associated with the first block of the blockchain, wherein the validation of the first outputs indicates successful execution of the tasks included in the first block of the blockchain;
executing one or more second tasks included in the second block of the blockchain and validating one or more second outputs obtained from executing the one or more second tasks included in the second block of the blockchain using one or more second validations rules associated with the second block of the blockchain, wherein the validation of the one or more second outputs indicates non-successful execution of the one or more second tasks included in the second block of the blockchain; and
in response to (i) the validation of the first outputs indicating successful execution of the tasks included in the first block of the blockchain and (ii) the validation of the one or more second outputs indicating non-successful execution of the one or more second tasks, executing one or more second rollback functions associated with the second block of the blockchain and one or more first rollback functions associated with the first block of the blockchain.

9. The method of claim 8, wherein executing the one or more first rollback functions associated with the first block of the blockchain comprises executing the one or more first rollback functions associated with the first block of the blockchain in response to (i) the validation of the first outputs indicating successful execution of the tasks included in the first block of the blockchain, (ii) the validation of the one or more second outputs indicating non-successful execution of the one or more second tasks included in the second block of the blockchain, and (iii) the execution of the one or more second rollback functions associated with the second block of the blockchain.

10. The method of claim 8, further comprising:
executing, based on a first pointer in the first block of the blockchain pointing to the second block of the blockchain, the one or more second tasks included in the second block of the blockchain.

11. The method of claim 8, wherein validating the first outputs comprises executing, based on a validation function pointer in the first block of the blockchain, one or more first validation functions associated with the validation function pointer on the first outputs obtained from executing the tasks included in the first block of the blockchain.

12. The method of claim 8, wherein executing the one or more first rollback functions associated with the first block of the blockchain comprises executing, based on a rollback function pointer in the first block of the blockchain, the one or more first rollback functions associated with the first block of the blockchain in response to (i) the validation of the first outputs indicating successful execution of the tasks included in the first block of the blockchain and (ii) the validation of the one or more second outputs indicating non-successful execution of the one or more second tasks included in the second block of the blockchain.

13. The method of claim 8, wherein generating the blocks of the blockchain based on the dependencies of the tasks comprises:
determining that no task of the first subset depends on an output of a task included in the second subset of the tasks;
assigning the first subset of the tasks to the first block of the blockchain based on the determination that no task of the first subset depends on an output of a task included in the second subset of the tasks;
determining that each task of the second subset depends on at least one task of the first subset;
assigning the second subset of the tasks to the second block of the blockchain based on the determination that each task of the second subset depends on at least one task of the first subset; and
generating the blocks of the blockchain based on the assignment of the first and second subsets respectively to the first and second blocks of the blockchain.

14. The method of claim 8, wherein generating the blocks of the blockchain based on the dependencies of the tasks comprises:
determining that no task of the first subset depends on an output of a task included in the second subset of the tasks and that no task of the first subset depends on an output of another task included in the first subset of the tasks;
assigning the first subset of the tasks to the first block of the blockchain based on the determination that no task of the first subset depends on an output of a task included in the second subset of the tasks and that no task of the first subset depends on an output of another task included in the first subset of the tasks;
determining that each task of the second subset depends on at least one task of the first subset and that no task of the second subset depends on an output of another task included in the second subset of the tasks;

assigning the second subset of the tasks to the second block of the blockchain based on the determination that each task of the second subset depends on at least one task of the first subset and that no task of the second subset depends on an output of another task included in the second subset of the tasks; and generating the blocks of the blockchain based on the assignment of the first and second subsets respectively to the first and second blocks of the blockchain.

15. A system comprising:

one or more processors programmed with instructions that, when executed by the one or more processors, cause operation comprising:

receiving data corresponding to tasks;

generating, based on dependencies of the tasks, blocks of a blockchain that collectively include the tasks, the blocks comprising a first block that include a first subset of the tasks and a second block that includes a second subset of the tasks and points back to the first block of the blockchain, wherein no task of the tasks included in the first block of the blockchain depends on an output of a task included the second block of the blockchain, and wherein each task of the tasks included in the second block of the blockchain depends on at least one task included in the first block of the blockchain;

executing all of the tasks included in the first block of the blockchain and validating first outputs, obtained from executing the tasks included in the first block of the blockchain, using one or more first validations rules associated with the first block of the blockchain;

executing one or more second tasks included in the second block of the blockchain and validating one or more second outputs obtained from executing the one or more second tasks included in the second block of the blockchain using one or more second validations rules associated with the second block of the blockchain; and in response to (i) the validation of the first outputs indicating successful execution of the tasks included in the first block of the blockchain and (ii) a validation, of one or more second outputs obtained from executing one or more second tasks included in the second block of the blockchain, indicating non-successful execution of the one or more second tasks, executing one or more second rollback functions associated with the second block of the blockchain and one or more first rollback functions associated with the first block of the blockchain.

16. The system of claim 15, wherein executing the one or more first rollback functions associated with the first block of the blockchain comprises executing the one or more first rollback functions associated with the first block of the blockchain in response to (i) the validation of the first outputs indicating successful execution of the tasks included in the first block of the blockchain, (ii) the validation of the one or more second outputs indicating non-successful execution of the one or more second tasks included in the second block of the blockchain, and (iii) the execution of the one or more second rollback functions associated with the second block of the blockchain.

17. The system of claim 15, the operations further comprising:

executing, based on a first pointer in the first block of the blockchain pointing to the second block of the blockchain, the one or more second tasks included in the second block of the blockchain.

18. The system of claim 15, wherein validating the first outputs comprises executing, based on a validation function pointer in the first block of the blockchain, one or more first validation functions associated with the validation function pointer on the first outputs obtained from executing the tasks included in the first block of the blockchain.

19. The system of claim 15, wherein executing the one or more first rollback functions associated with the first block of the blockchain comprises executing, based on a rollback function pointer in the first block of the blockchain, the one or more first rollback functions associated with the first block of the blockchain in response to (i) the validation of the first outputs indicating successful execution of the tasks included in the first block of the blockchain and (ii) the validation of the one or more second outputs indicating non-successful execution of the one or more second tasks included in the second block of the blockchain.

20. The system of claim 15, wherein generating the blocks of the blockchain based on the dependencies of the tasks comprises:

assigning the first subset of the tasks to the first block of the blockchain based on a determination that no task of the first subset depends on an output of a task included in the second subset of the tasks and that no task of the first subset depends on an output of another task included in the first subset of the tasks;

assigning the second subset of the tasks to the second block of the blockchain based on a determination that each task of the second subset depends on at least one task of the first subset and that no task of the second subset depends on an output of another task included in the second subset of the tasks; and generating the blocks of the blockchain based on the assignment of the first and second subsets respectively to the first and second blocks of the blockchain.

\* \* \* \* \*